United States Patent [19]
Mignard et al.

[11] Patent Number: 5,879,539
[45] Date of Patent: Mar. 9, 1999

[54] PRECIOUS METAL AND SILICA-ALUMINA BASED CATALYST AND HYDROISOMERISATION TREATMENT PROCESS FOR HEAVY FEEDS

[75] Inventors: Samuel Mignard, Chatou; Nathalie Marchal, Paris; Slavik Kasztelan, Malmaison; Pierre-Henri Bigeard, Vienne; Alain Billon, Le Vesinet, all of France

[73] Assignee: Institut Francais du Petrole, France

[21] Appl. No.: 556,943

[22] PCT Filed: Mar. 22, 1995

[86] PCT No.: PCT/FR95/00352

§ 371 Date: Apr. 3, 1996

§ 102(e) Date: Apr. 3, 1996

[87] PCT Pub. No.: WO95/26819

PCT Pub. Date: Oct. 12, 1995

[30] Foreign Application Priority Data

Apr. 1, 1994 [FR] France ................................ 94 03866
Apr. 1, 1994 [FR] France ................................ 94 03867

[51] Int. Cl.$^6$ .............................. C10G 35/06; B01J 23/56
[52] U.S. Cl. ................................. 208/138; 208/216 PP; 502/332; 502/333; 502/334; 502/235; 502/238; 502/258; 502/261; 502/263
[58] Field of Search ........................... 502/333, 334, 502/327, 339, 235, 238, 258, 262, 263, 332; 208/138, 216 PP

[56] References Cited

U.S. PATENT DOCUMENTS 5,157,187  10/1992  Le et al. ................................ 208/138

FOREIGN PATENT DOCUMENTS 0 131 925  1/1985  European Pat. Off. .
0 160 475  11/1985  European Pat. Off. .
0 533 451  3/1993  European Pat. Off. .
2 563 120  10/1985  France .
2 565 504  12/1985  France .

*Primary Examiner*—Glenn A. Caldarola
*Assistant Examiner*—In Suk Bullock
*Attorney, Agent, or Firm*—Millen, White, Zelano & Branigan, P.C.

[57] ABSTRACT

The invention concerns a catalyst for conversion of hydrocarbon feeds. The catalyst is essentially constituted by 0.05% to 10% by weight of a precious metal and a silica (5–70%)/alumina support with a specific surface area of 100–500m$^2$/g. The catalyst has an average pore diameter of 1–12 nm, the pore volume of pores with diameters between the average diameter±3 nm being more than 40% of the total pore volume. The dispersion of the precious metal is 20–100% and the distribution coefficient for the precious metal is greater than 0.1.

The invention also concerns a process for the hydroisomerization of feeds with boiling points of more than 350° C. using this catalyst. The process is operated between 200° C. and 450° C. at 2–25 MPa with a VVH of 0.1–10 h$^{-1}$ and a hydrogen/feed volume ratio of 100–2000.

6 Claims, No Drawings

PRECIOUS METAL AND SILICA-ALUMINA BASED CATALYST AND HYDROISOMERISATION TREATMENT PROCESS FOR HEAVY FEEDS

SUMMARY OF THE INVENTION

The present invention concerns a catalyst used in hydroconversion processes for feeds with reduced metal contents.

The present invention also concerns a hydroconversion and hydroisomerization process for feeds with boiling points which are essentially above 350° C. and with reduced metal contents.

The process is particularly advantageous for the hydroisomerization treatment of feeds (such as hydrocracking residues) to obtain very high added value products such as kerosine, gas oils and lubricating oils.

A number of catalysts can be used to carry out the hydroisomerization reaction. U.S. Pat. No. 4,,929,795, for example, describes the use of a catalyst composed of 0.6% by weight of platinum deposited on a halogenated alumina containing 7.2% by weight of fluorine to obtain lubricating oils from paraffins. We have developed a halogen-free catalyst which can be used in a simpler process since the catalyst just described requires continuous injection of the fluorinated compound into the catalytic unit.

U.S. Pat. No. 4,428,819 describes a catalyst containing a zeolite which is used to carry out the isomerization of a mixture of paraffins from oil mixed with a lubricating oil obtained by catalytic deparaffination with a view to improving the cloud point. Finally, U.S. Pat. No. 4,547,283 describes a hydroisomerization catalyst for paraffins from oil containing at least one active metal from group 2A, 3A, 4A and/or 4B of the periodic classification of the elements on a support which is preferably silica.

We have developed a catalyst which is easier to use by avoiding the use of the zeolite or addition of supplemental elements during manufacture of the catalyst.

All the catalysts which are currently used for hydroconversion are bifunctional, combining an acidic function with a hydrogenating function. The acidic function is provided by supports with large surface areas (generally 150 to 800 $m^2g^{-1}$) with surface acidity, such as halogenated aluminas (in particular chlorinated or fluorinated), phosphorous-containing aluminas, combinations of boron oxides and aluminium, amorphous silica-aluminas and silica-aluminas. The hydrogenating function is provided either by one or more metals from group VIII of the periodic classification of the elements, such as iron, cobalt, nickel, ruthenium, rhodium, palladium, osmium, iridium and platinum, or by combination of at least one metal from group VI such as chromium, molybdenum and tungsten with at least one metal from group VIII.

The balance between the acidic and hydrogenating functions is a fundamental parameter which governs the activity and selectivity of the catalyst. A weak acidic function and a strong hydrogenating function produces catalysts which are less active and selective as regards isomerization while a strong acidic function and a weak hydrogenating function produces very active and selective catalysts as regards cracking. A third possibility is to use a strong acidic function and a strong hydrogenating function to obtain a very active but also very selective isomerization catalyst. It is thus possible, by judicious choice of each of the functions, to adjust the activity/selectivity balance of the catalyst.

Our research on a number of silica-aluminas has led to the discovery that, surprisingly, the use of a catalyst comprising a particular silica-alumina can produce catalysts which are very active but also very selective in certain reactions such as isomerization of feeds as defined below.

More precisely, the catalyst of the invention is essentially constituted by 0.05–10% by weight of at least one precious metal from group VIII deposited on an amorphous silica-alumina support which contains 5–70% by weight of silica and has a BET specific surface area of 100–500 $m^2/g$, the catalyst having:

an average pore diameter of between 1–12 nm, a pore volume of pores with diameters between the average diameter as defined above reduced by 3 nm and the average diameter as defined above increased by 3 nm, of more than 40% of the total pore volume, a precious metal dispersion of between 20–100%, a distribution coefficient for the precious metal of more than 0.1.

In more detail, these characteristics are:

Silica content:

the support used to prepare the catalyst described in this patent is composed of silica $SiO_2$ and alumina $Al_2O_3$. The silica content, expressed as the percentage by weight, is between 5% and 70%, preferably between 20% and 60%, more preferably between 22% and 45%. This content can be accurately measured using X ray fluorescence. It is constant over the whole of the catalyst, i.e., the silica concentration is not higher at the catalyst surface, for example. The silica in the catalyst is homogeneous.

Nature of precious metal:

for this particular reaction type, the metallic function is provided by a precious metal from group VIII of the periodic classification of the elements, in particular platinum.

Precious metal content:

the precious metal content, expressed in weight % of metal with respect to the catalyst, is between 0.05 and 10, preferably between 0.1 and 5.

Precious metal dispersion:

The dispersion, representing the fraction of the metal which is accessible to the reactant with respect to the total quantity of metal in the catalyst, can be measured, for example, by $H_2/O_2$ titration. The metal is first reduced, i.e., it undergoes treatment in a hydrogen stream at high temperature under conditions which transform all the platinum atoms accessible to hydrogen to the metal. An oxygen stream is then passed under operating conditions which oxidize all the reduced platinum atoms which are accessible to oxygen to $PtO_2$. By calculating the difference between the quantity of oxygen introduced and the quantity of oxygen leaving, the amount of oxygen consumed can be deduced. This value allows the quantity of platinum which is accessible to oxygen to be deduced. The dispersion is thus equal to the ratio of the quantity of platinum which is accessible to oxygen over the total quantity of platinum in the catalyst. In our case, the dispersion is between 20% and 100%, preferably between 30% and 100%.

Precious metal distribution:

distribution of the precious metal represents the distribution of the metal inside a grain of the catalyst, the metal being well or poorly dispersed. Thus it is possible to obtain poorly distributed platinum (detected, for example, in a ring in which the thickness is substantially lower than the radius of the grain) but which is well dispersed, i.e., all the platinum atoms in the ring are accessible to the reactants. In our case, the platinum distribution is good, i.e., the platinum profile, measured using the Castaing microprobe analysis method, has a distribution coefficient for more than 0.1, preferably more than 0.2.

BET surface area:
the BET surface area of the support is between 100 m$^2$/g and 500 m$^2$/g, preferably between 250 m$^2$/g and 450 m$^2$/g, more preferably between 310 m$^2$/g and 450 m$^2$/g.

Average pore diameter:
the average pore diameter of the catalyst is measured from a pore distribution profile obtained using a mercury porosimeter. The average pore diameter is defined as the diameter corresponding to the zero point of the curve derived from the mercury porosity curve. The average pore diameter, as defined, is between 1 nm (1×10$^{-9}$ meter) and 12 nm (12×10$^{-9}$ meter), preferably between 2.5 nm (2.5×10$^{-9}$ meter) and 11 nm (11×10$^{-9}$meter), more preferably between 4 nm (4×10$^{-9}$ meter) and 10.5 nm (10.5×10$^{-9}$ meter), and advantageously between 3 and 9 nm.

Pore distribution:
the catalyst of this patent has a pore distribution such that the pore volume of the pores with diameters between the average diameter as defined above reduced by 3 nm and the average diameter as defined above increased by 3 nm (i.e., the average diameter±3 nm) is more than 40% of the total pore volume, preferably between 50% and 90% of the total pore volume, more advantageously between 50% and 80% of the total pore volume and most advantageously between 50% and 70% of the total pore volume. The catalyst thus has a uniform pore distribution, more monomodal than bimodal.

Total pore volume of support:
this is generally less than 1.0 ml/g, preferably between 0.3 and 0.9 ml/g, and more advantageously less than 0.85 ml/g. In general, the support has a total pore volume of more than 0.55 ml/g, preferably at least 0.6 ml/g.

The silica-alumina is prepared and formed using the usual methods which are well known to the skilled person. Advantageously, the support is calcined prior to impregnation of the metal, for example by heat treatment at 300–750° C. (preferably 600° C.) for 0.25–10 hours (preferably 2 hours) in 2–30% by volume of steam (preferably 7.5%).

The metal salt is introduced using one of the usual methods for depositing metal (preferably platinum) on a support surface. One of the preferred methods is dry impregnation which involves introducing the metal salt in a volume of solution which is equal to the pore volume of the catalyst mass to be impregnated. Before reduction, the catalyst can be calcined, for example by treatment in dry air at 300–750° C. (preferably 520° C.) for 0.25–10 hours (preferably 2 hours).

Before its use in the conversion reaction, the metal contained in the catalyst must be reduced. One preferred method for reducing the metal is treatment in hydrogen at a temperature of between 150° C. and 650° C. at a total pressure of between 0.1 and 25 MPa. Reduction involves, for example, a 2 hour stage at 150° C. followed by raising the temperature to 450° C. at a rate of 1° C./min then a 2 hour stage at 450° C.: during the whole of this reduction step, the hydrogen flow rate is 1000 l hydrogen/l. catalyst. It should also be noted that any ex-situ reduction method is suitable.

The catalyst described is active, for example, for hydroisomerization of feeds such as those described below, to obtain a large quantity of products resulting from hydroisomerization of the molecules present in the initial feed. It is of particular interest to produce products which can then be used as components of lubricating products.

Any clean feed can be used, for example vacuum distillates, vacuum residues, atmospheric residues or paraffin products from deparaffination of an oil feed, for example when the feed is a deasphalted vacuum residue. These feeds contain molecules containing at least about 10 carbon atoms. They may contain paraffin fragments or they may be entirely paraffinic, and the aromatic carbon content is at most 20% by weight of the total carbon atoms in the feed. The term clean feed means feeds in which the sulfur content is less than 1000 ppm by weight, preferably less than 500 ppm by weight, more preferably less than 300 ppm by weight, and the nitrogen content is less than 200 ppm by weight, preferably less than 100 ppm by weight, more preferably less than 50 ppm by weight. The metal content of the feed, such as nickel and vanadium, is extremely low, i.e., less than 50 ppm by weight, more advantageously less than 10 ppm by weight.

Heavy feeds are preferably hydroisomerized, such as hydrocracking residues, i.e., those with boiling points of essentially more than 350° C. These feeds contain molecules with at least about 20 carbon atoms containing paraffinic fragments or which are entirely paraffinic molecules. Hydroisomerization essentially concerns paraffins, in particular n-paraffins, and produces isoparaffins.

The operating conditions employed for this hydroisomerization reaction are a temperature of 200° C. to 450° C., preferably 250° C. to 430° C., advantageously above 340° C., a hydrogen partial pressure of 2 MPa to 25 MPa, preferably between 3 MPa and 20 MPa, an hourly space velocity of between 0.1 and 10 h$^{-1}$, preferably between 0.2 and 2$^{-1}$, and a hydrogen ratio of between 100 and 2000 litres of hydrogen per liter of feed, preferably between 150 and 1500 liters of hydrogen per litre of feed.

The use of this catalyst is not limited to hydroisomerization, but it is generally suitable for conversion of hydrocarbons under suitable conditions to obtain the desired conversion.

EXAMPLE

The Example described below illustrates the features of the invention without in any way limiting its scope.

Preparation of catalyst:

The support was a silica-alumina in the form of extrudates. It contained 29.1% by weight of silica SiO$_2$ and 70.9% by weight of alumina Al$_2$O$_3$. Before addition of the precious metal, the silica-alumina had a surface area of 389 m$^2$/g and an average pore diameter of 6.6 nm. The total pore volume of the support was 0.76 ml/g.

The corresponding catalyst was obtained after impregnation of the precious metal into the support. The platinum salt Pt(NH$_3$)$_4$Cl$_2$ was dissolved in a volume of solution which corresponded to the total pore volume to be impregnated. The solid was then calcined for 2 hours in dry air at 520° C. The platinum content was 0.60% by weight. The platinum dispersion was 60% and the distribution was uniform across the grain. The catalyst had a pore volume of 0.75 ml/g, a BET surface area of 332 m$^2$/g and an average pore diameter of 6.5 nm. The pore volume corresponding to pores with diameters between 3.5 nm and 9.5 nm was 0.46 ml/g, i.e., 59% of the total pore volume.

The pore distribution of this catalyst was as follows:

| Pore diameter < 6 nm | pore volume = 0.16 ml/g = 21% of total |
|---|---|
| 6–15 nm | 0.36 ml/g = 48% |
| 15–60 nm | 0.06 ml/g = 8% |
| >60 nm | 0.17 ml/g = 23%. |

Feed characteristics:

The table below lists the physico-chemical characteristics of the feed used for the hydroisomerization reaction. This was a hydrocracking residue from a vacuum distillation cut.

| d 154 | 0.859 |
|---|---|
| Sulphur (wt %) | 0.0012 |
| Nitrogen (ppm by wt) | 1.8 |
| Pour point | +30° C. |
| IBP | 104 |
| 5% | 327 |
| 10% | 385 |
| 50% | 452 |
| 90% | 519 |
| 95% | 536 |
| CP | 573 |

Production of lubricating oil after reaction:

The catalyst prepared as described above was used to prepare a lubricating oil by hydroisomerization of the feed described.

The reaction took place at 355° C., at a total pressure of 12 MPa, an hourly space velocity of 1 h$^{-1}$ and a hydrogen flow rate of 1000 l hydrogen/l feed. Under these operating conditions, the net conversion to 400- was 55% by weight and the lubricating oil yield was 85% by weight. The recovered oil had a VI of 135.

The following table compares the characteristics of the oil after hydroisomerisation with those of the oil extracted from a hydrocracking residue using a conventional solvent extraction method (MEK/Tol). It can be seen that the two oils are very close as regards density and viscosity. On the other hand, the VIs, pour points and above all the oil/residue yields are better for the hydroisomerized product.

|  | Solvent deparaffination | Hydroisomerisation |
|---|---|---|
| d15/4 | 0.842 | 0.840 |
| v (100° C.) (m$^2$/s) | 5.0 × 10$^{-6}$ | 4.9 × 10$^{-6}$ |
| VI | 125 | 135 |
| Pour point (°C.) | −15 | −18 |
| Oil/residue yield (wt %) | 78 | 88.5 |

We claim:

1. In a process for the hydroisomerization treatment of heavy petroleum cuts with boiling points of essentially greater than about 350° C., with a nitrogen content of less than about 200 ppm by weight and a metal content of less than about 50 ppm by weight, said process being operated at a temperature of about 200–450° C., at a partial pressure of hydrogen of about 2–25 MPa, at an hourly space velocity of 0.1–10 h$^{-1}$ and a hydrogen/feed volume ratio of about 100–2000, the improvement comprising using a catalyst comprising 0.05–10% by weight of at least one metal from group VIII which is Pt, Pd, Ir, Rh, Ru or Os deposited on an amorphous silica-alumina support, said catalyst containing neither zeolite nor halogen, and having a constant silica content, wherein said support contains 5–70% by weight of silica and has a BET specific surface area of 100–500 m$^2$/g, the catalyst having:

an average pore diameter of between 1–12 nm,
   a pore volume of pores with diameters between the average diameter reduced by 3 nm and the average diameter increased by 3 nm, of more than 40% of the total pore volume,
   a group VIII metal dispersion of between 20–100%,
   a distribution coefficient for the group VIII metal of more than 0.1.

2. A process according to claim 1, wherein the group VIII metal is Pt.

3. A process according to claim 1, wherein the support has a average pore diameter between 2.5 and 11 nm.

4. A process according to claim 1, wherein the pore volume of pores with diameters between the average diameter reduced by 3 nm and the average diameter increased by 3 nm is between 50% and 90% of the total pore volume.

5. A process according to claim 1, wherein the support contains 20–60% by weight of silica.

6. A process according to claim 1, wherein the support has a BET surface area of between 250 and 450 m$^2$/g.

* * * * *